United States Patent [19]

Schüssler

[11] Patent Number: 4,734,191

[45] Date of Patent: * Mar. 29, 1988

[54] APPARATUS FOR THE INTERMITTENT AERATION OF LIQUIDS

[76] Inventor: Karl H. Schüssler, Philipp-Reis-Strasse 18, D-6460 Gelnhausen, Fed. Rep. of Germany

[*] Notice: The portion of the term of this patent subsequent to Dec. 23, 2003 has been disclaimed.

[21] Appl. No.: 910,497

[22] Filed: Sep. 23, 1986

Related U.S. Application Data

[63] Continuation of Ser. No. 732,640, May 10, 1985, Pat. No. 4,631,134.

[30] Foreign Application Priority Data

Sep. 12, 1984 [EP] European Pat. Off. .......... 84710032
Apr. 10, 1985 [EP] European Pat. Off. .......... 85104359

[51] Int. Cl.⁴ .............................................. C02F 3/20
[52] U.S. Cl. .................................. 210/220; 261/122; 261/124
[58] Field of Search ............... 210/752, 758, 194, 219, 210/220, 242.2; 261/77, 93, 122, 174, DIG. 70, DIG. 71

[56] References Cited

U.S. PATENT DOCUMENTS

| | | |
|---|---|---|
| 3,532,272 | 10/1970 | Bronton ..................... 261/122 X |
| 3,768,788 | 10/1973 | Condel ........................ 261/122 |
| 3,997,634 | 12/1976 | Downs ......................... 261/122 |
| 4,070,279 | 1/1978 | Armstrong .................. 261/77 X |
| 4,288,394 | 9/1981 | Ewing et al. ................ 261/122 |
| 4,631,134 | 12/1986 | Schüssler ..................... 210/758 |

Primary Examiner—Tom Wyse
Attorney, Agent, or Firm—Gilbert L. Wells

[57] ABSTRACT

An apparatus for the aeration of off-water or the like media in an aeration tank with the aid of an aeration face arranged below the water surface. The device comprises a rigid, self-supporting supporting body provided with throughholes or being of porous material and covered with an elastic diaphragm; air is supplied to the supporting face of the body at the center of gravity or a gravity line thereof into a deflecting region and from there to the periphery of the body which is slightly raised vis-a-vis the central region of the body, from where the air escapes with decreasing pressure into the water to be aerated. The aeration face can be adapted to be swivelled, and the cross-sectional area of the supporting body can be of pyramid, wedge, circular or frustoconical configuration or it can be vaulted in a concave or convex manner. Basic shapes of the supporting body are a circular or a polygonal, preferably rectangular configuration.

12 Claims, 11 Drawing Figures

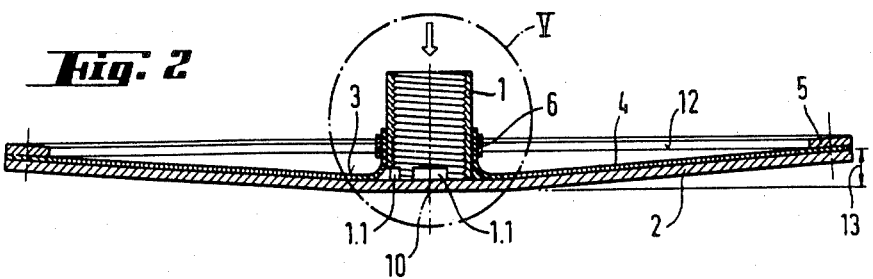
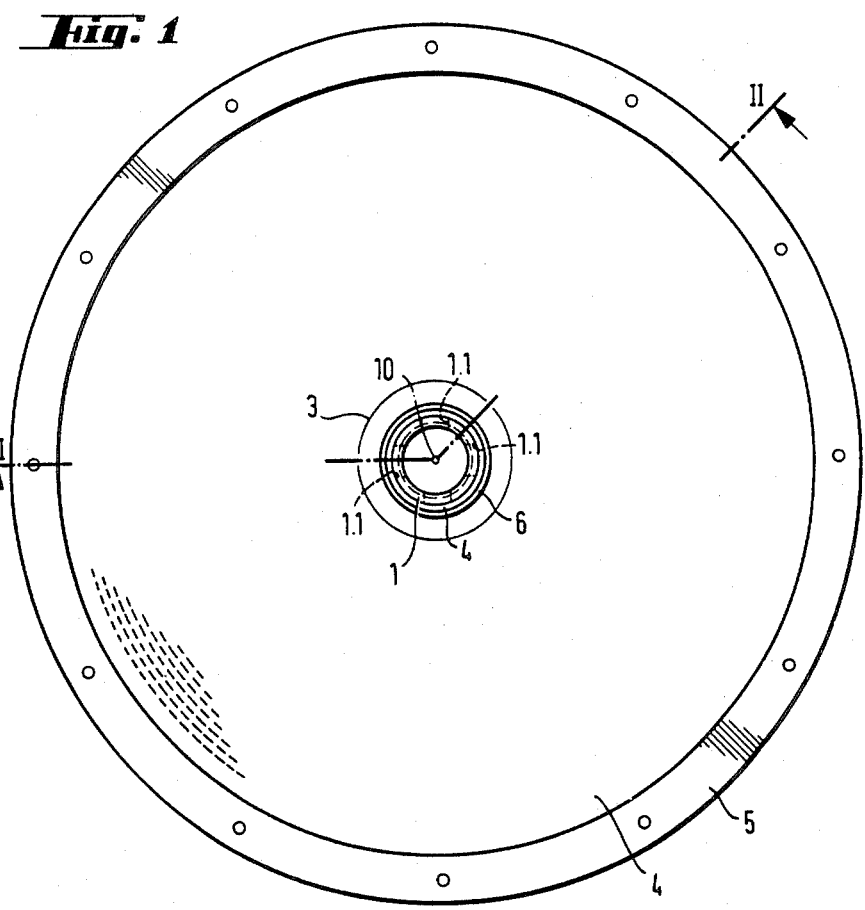

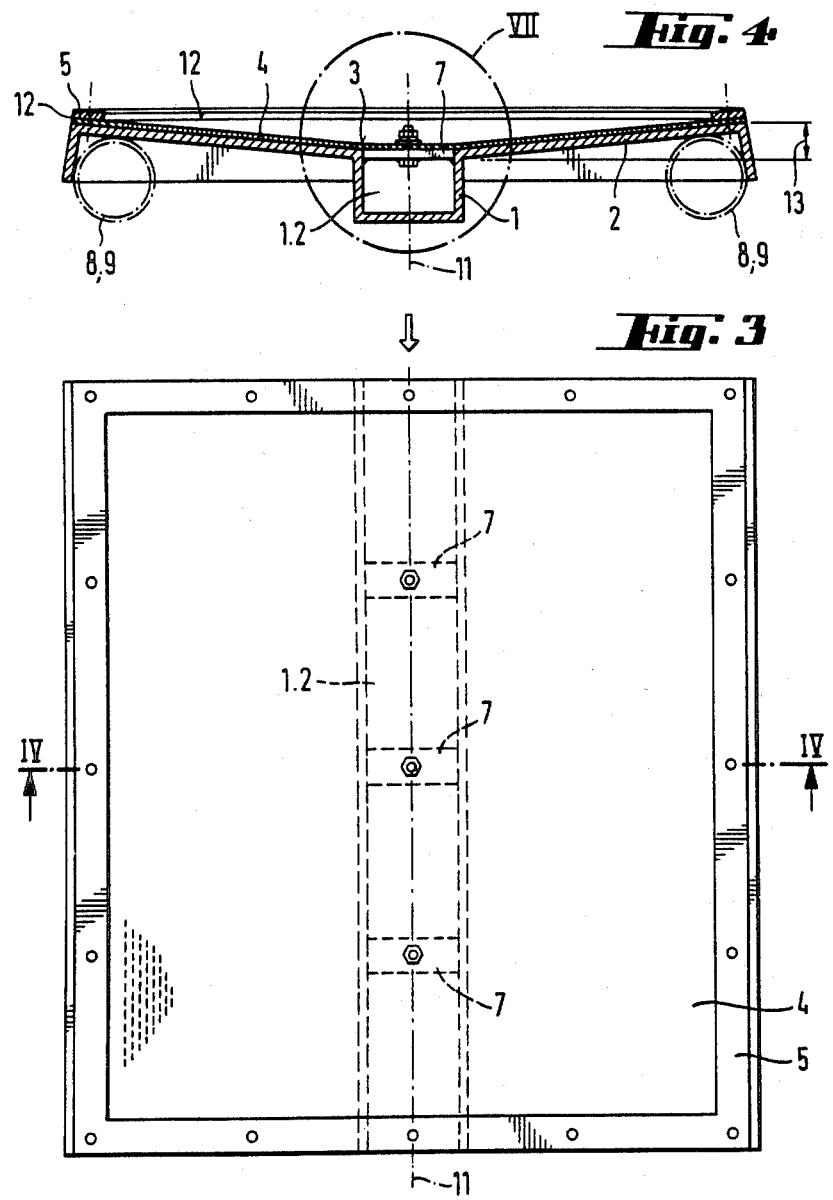

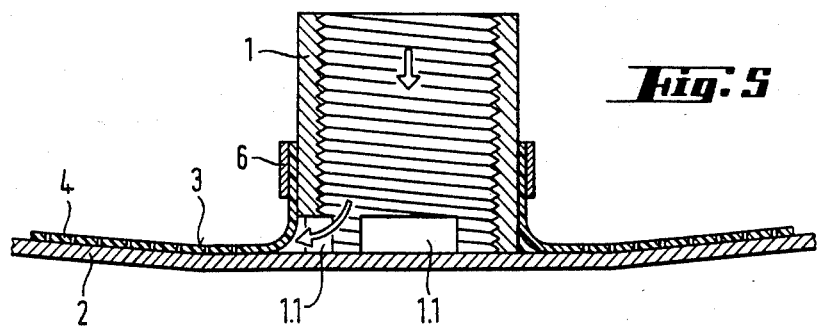
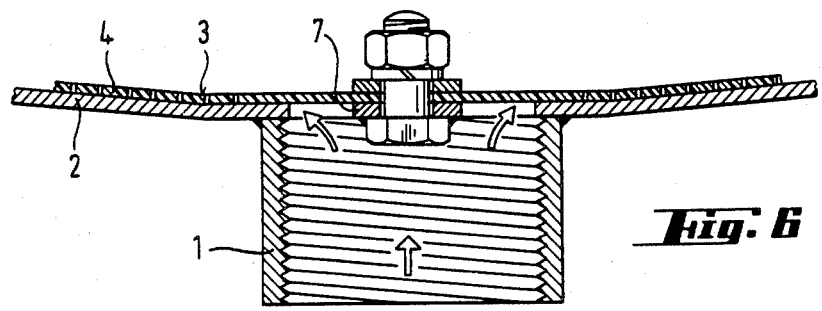
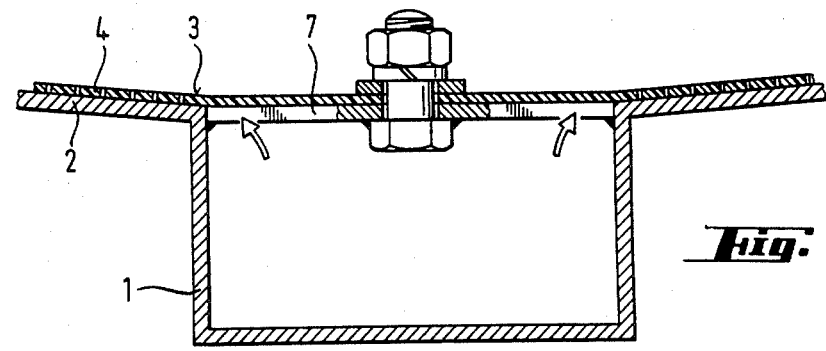

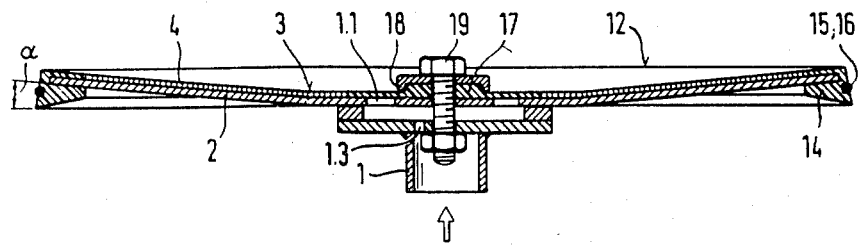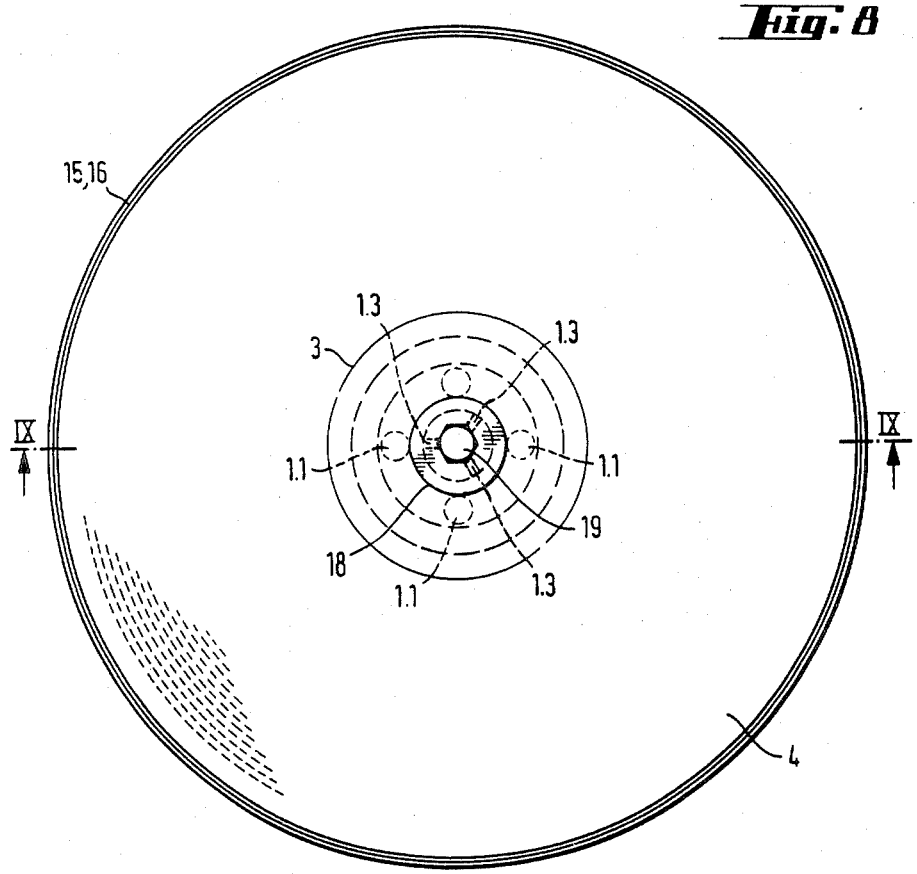

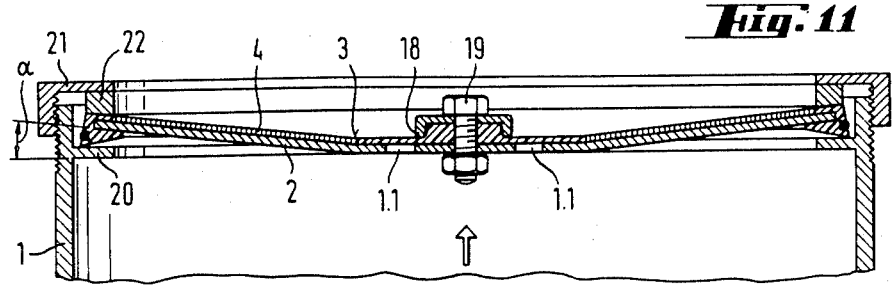
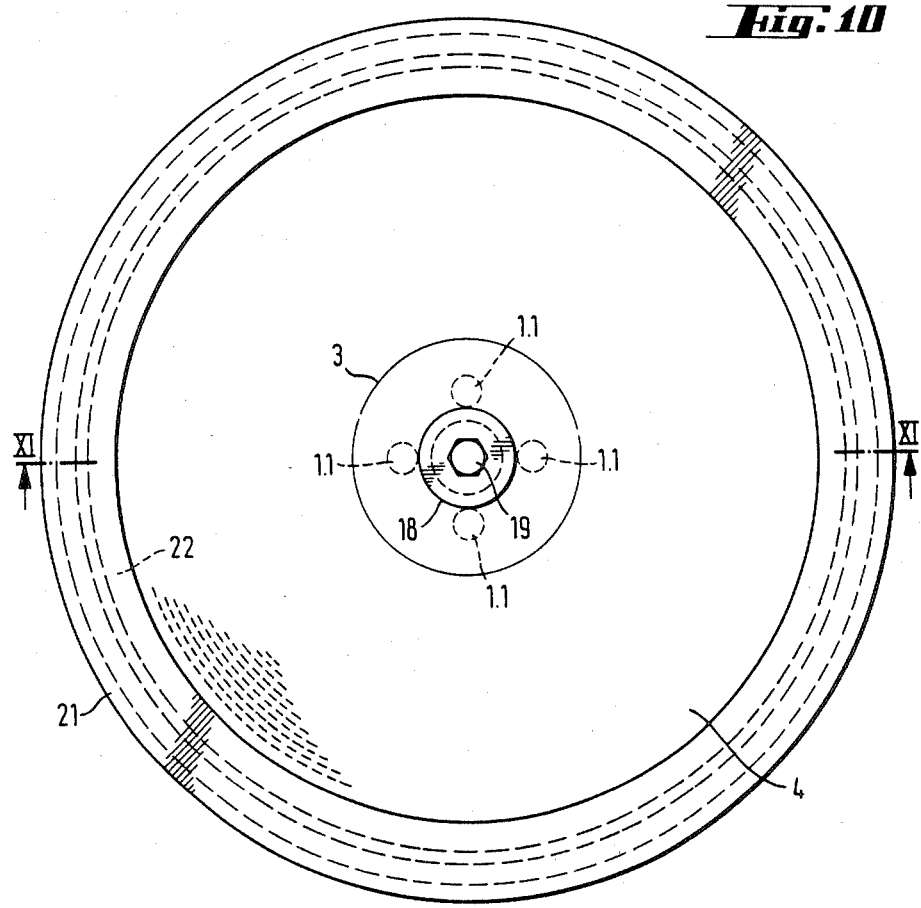

APPARATUS FOR THE INTERMITTENT AERATION OF LIQUIDS

This application is a continuation of Ser. No. 732,640, filed May 10, 1985, now U.S. Pat. No. 4,631,134

BACKGROUND OF THE INVENTION

This invention relates to an apparatus for the intermittent aeration of liquids such as, for instance, waste water or the like media in aeration tanks by means of an aeration device arranged below the surface of the liquid and comprising at least one supporting body, an air-feeding line, and a preferably elastic diaphragm covering the supporting body and being of air-tight material having as perforations punctures, slots or holes in parts thereof, as well as a frame structure locking the supporting body in position.

An air-distributing device for carrying out a process of aeration by treating water with fine air bubbles is known from the German patent No. 29 42 607, the criterion of which is the arrangement of an air-tight foil and a perforated foil superimposed on the former, in a frame constituted by two oppositely directed angle frames which have the function of a tentering frame, with supporting stays extending underneath the unperforated foil being further connected to the said frame. Above the perforated foil, there are provided further, uniformly distributed stabilizing foils at a short distance from the foil, which extend at 90° relative to the lower stays.

A thus devised air distributor will indeed fulfill the tasks confronting it in this instance in so far as a most uniform distribution of air possible can be achieved over the entire distributor surface. This device suffers, however, from the drawback of requiring a relatively heavy, well stiffened, weight-demanding double frame construction which renders manipulation of the aerator in the aeration tank difficult.

A further drawback of this construction is the position of the plane in which the aeration surface lies under the surface of the water, which position depends on the weight and cannot be adjusted.

Furthermore, devices are known which have supporting bodies provided with openings for the passage of air and covered by a perforated air-distributing foil or enveloped by a perforated hose, and which as a rule require the arrangement of additional tensioning means for locking the hoses or foils, respectively, in position.

These known devices suffer generally from the drawback that, in the case of possible damaging of the air distributor foil which can always occur for any number of reasons, water may penetrate into the supporting body and can lead to a premature closing of the perforations, in particular in a period of rest.

Moreover, it is not only the air-distributing foil or perforated hose, respectively, which is endangered by the entering waste water but especially the supporting body itself as the cross sectional areas of the air discharge openings in the supporting body are in such a case openly accessible practically without restriction.

It is a further drawback that, in the case of tubular aerators, only the upper reach can be considered as the aerating region proper, and this region is, in many cases, interrupted by auxiliary holding sleeves or the like.

As in the case of the initially named publication, an attempt is often made to give the aerating foil a position of aeration as nearly horizontal as possible, with the aid of stays keeping it down, in order to avoid excessive tensioning of the upwardly vaulted region thereof.

As a foil displacement underneath the stays cannot be excluded, excessive tensioning may nevertheless occur in the individual supported areas.

The superpositioning of sheet metal sieves which has also been tried, will reduce the uniformity of air distribution.

SUMMARY OF THE INVENTION

Taking into account this situation, it is a task of the instant invention to provide an apparatus of the initially described kind which, in principle, facilitates the manipulation of aeration surface relative to the plane of the water surface, by means of a specific, substantially lighter embodiment thereof, thereby enabling a particularly effective adjustment of the direction, distribution and concentration of the feeding of air into the waste water, with the least possible covering and obstruction of the air discharge caused by supporting built-in parts.

This problem is solved, in accordance with the invention by providing, in the initially described process, a rigid, self-supporting supporting body being porous or provided with perforations and covered by an elastic diaphragm, on to which body the air is directed substantially vertically in at least one deflecting reach, and substantially in its center of gravity or in series distributed along a gravity line, and toward the wing periphery which is disposed slightly higher vis-a-vis that center of gravity, with decreasing pressure into the water to be aerated, in an aerating plane which is inclined with regard to the water surface at an angle of up to ±90° and can be swivelled to adjust that angle.

By the use of a self-supporting aeration plane which is inclined at an angle of up to ±90° toward the periphery relative to the center of gravity, and whose cross-sectional area is of frustoconical, calotte, circle, wedge or pyramid shape, and, lastly, forms an umbrella when rounded aeration planes are used, there is made possible, by this shaping alone, the formation of a specific light-weight supporting wing of high stability, while, simultaneously, the aeration plane can be of articulated, i.e. slewable embodiment.

One should keep in mind that in the case of a normal arrangement, i.e. an arrangement of the plane of the periphery parallel with the water surface, the region of the aeration tank to be aerated will suffer a bundling connected with an increase in the aeration concentration by a degree dependent on the pressure, at a given displacement of its level vis-a-vis the air supply, which displacement is directed toward the water level, while it will become enlarged, connected with a decrease of the aeration concentration, at a displacement of the said level away from the water surface.

Of course, as a rule, a vaulting of the supporting face toward the water surface in the shape of a wedge, cone or pyramid will be preferred as this will afford the most uniform tensioning of the diaphragm, starting from the region of air supply up to the periphery.

A reverse arrangement is likewise possible which, however demands special care in affixing the diaphragm in the region of air supply, and the embodiment of the supporting body face from the region of air supply up to the periphery is suitably inwardly vaulted, i.e. of concave shape.

In the case of particularly deep tanks, it may even be suitable to tend the membrane facing downwardly over a body of calotte, circle or spherical shape, so that the air is first discharged in the direction toward the tank bottom, and then deflected upwardly via the peripheral region.

The dispersion and the velocity of a complete or partial discharge of the supplied air can be improved still further by causing the aeration face and thereby the wing face to rotate about the center of gravity and to transfer the air into a divergent vortex trail.

A device suitable for carrying out the above-described process according to the invention comprises a rigid supporting body face constituting an aeration surface in connection with a diaphragm and being of random shape, the static resistance of which is determined, besides the choice of material and the dimensioning of its thickness, by the magnitude of the displacement of its level to the edge-limiting periphery thereof, situated up to ±90° between the deepest point or the deepest limit in the center of gravity or on the gravity line, and that the inclination of the same determined by the cross-sectional area of the supporting body face, leading from the deepest point or deepest limit to the edge-limiting periphery, is formed to extend straight-lined, shaped as a circle or calotte or, in the direction of a raised level, with concave or convex shape.

Concerning the selection of material to be decided upon for making the aerator face, it should be noted that the same can be made from high-quality steel, porous or sintered material synthetic resin material or the like substances.

As a rule, the diaphragm is made in a conventional manner, from an elastomer, in particular synthetic caoutchouc the elasticity behavior of which is adjustable in the widest range. In order to be able to adapt the elastic behavior of the diaphragm from the region of air entry to the outermost edge thereof, the diaphragm can be of varying thickness.

With regard to the connection of the supporting body it is recommended that the air feeding connection is a tubulure provided, as the case may be, with transverse discharge openings, to which the diaphragm is connected by means of clamps.

It is further recommended that, for instance, a round diaphragm is so thickened at its central region that it can be fastened on the supporting wing by means of a clamping disc having a bead and a screw, and that it can be screw-connected with the air supply socket.

A fastening of the diaphragm with the supporting body at the outer rim calls for providing the diaphragm with a circumferential sleeve surrounding the supporting wing as a sealing sleeve, a groove being optionally provided in the sleeve and being engageable by a circumferential clamp.

When the supporting wing is of rectangular or polygonal shape, it is recommended that the same is connected, in the direction of its principal extension, with an open channel as the air supply connection, in which case the diaphragm is connected with the supporting wing via clamping straps.

In particular in the case of large area aeration it is advisable that the passages for the ambient water will promote the uniformity of air distribution.

In order to facilitate the positions of operation in depth and for repair of the device, inflatable and/or stationary floating bodies are attached to the same.

With regard to the adjustability and the inclination of the aeration face relative to the liquid surface it is to be borne in mind that the aeration face can be inclined relative to the liquid surface at an angle of up to ±90° or vaulted and slewable.

Any double angle connection can be used, for instance in the air feeding line in order to provide slewability.

The normally round or rectangular supporting wings can be optionally provided with throughholes of random shape.

Furthermore, the diaphragm may consist of woven or knitted synthetic resin fabric, or the elastic diaphragm can be a metal foil.

The diaphragm is provided with perforations in the shape of holes or cuts of slot, star or cross shape through which the air is introduced into the water in the form of fine bubbles. In the region of openings in the supporting wing these perforations are preferably omitted. The perforations should be in staggered arrangement in order to impart to the diaphragm the greatest possible stability.

The terms "deepest point" and "deepest limit" relate respectively to the peak limits (point or line) and can be taken as directed downwardly as well as upwardly.

The process according to the invention and the device for carrying out the same thus fully comply with the initially set task.

BRIEF DESCRIPTION OF THE DRAWINGS

The process according to the invention will be explained in more detail in connection with the accompanying drawings which show devices suitable for carrying the process out in practice. In these drawings FIG. 1 shows a top view of a first embodiment of the device according to the invention, of rounded shape;

FIG. 2 is a sectional view taken along a plane indicated in FIG. 1 by II—II;

FIG. 3 is a top view of another embodiment, of rectangular shape;

FIG. 4 is a cross-sectional view of the same embodiment along a plane indicated in FIG. 3 by IV—IV;

FIG. 5 shows in cross-sectional view a detail of the air supply and the deflecting zone with the air being fed from above;

FIG. 6 shows in cross-sectional view a detail of the air supply and deflecting zone, with the air being fed from below;

FIG. 7 is a cross-sectional view, taken in the region of the gravity line, of a channel-shaped air supply;

Fig.8 is a top view of a further embodiment of the device according to the invention, of round shape;

FIG. 9 is a cross-sectional view of the same embodiment taken in a plane indicated by IX—IX in FIG. 8;

FIG. 10 is a top view of yet another embodiment of the device according to the invention; and Fig.11 is a cross-sectional view of the same embodiment taken in a plane indicated by XI—XI in FIG. 10.

DETAILED DESCRIPTION OF THE EMBODIMENTS SHOWN IN THE DRAWINGS

The air feeding lines 1 represented in the FIGS. 1, 2 and 5 have a supply socket which is directed from above toward a rigid supporting wing 2 and arranged as a rule at the center of gravity 10, which is in general fastened to the center of gravity of the face, and which, as shown in the drawings, is provided in a deflecting region 3 with transverse discharge openings 1.1.

On the supporting wing 2 there lies an elastic perforated diaphragm 4 which is affixed along its periphery 12 by means of a clamping device 5, and at the air supply socket by means of a clamping collar 6. In the case of the embodiment of FIG. 6, a socket, for the supply of air, and provided with an internal threading, is connected from below to the supporting wing 2, the partial region of the wing 2 being surrounded by the socket 5 being in open condition. The connection with the diaphragm 4 is effected via a clamping strap 7 fastened in alignment with the upper end of the socket.

The embodiment shown in FIGS. 3 and 4 is a rectangular aerator provided with a channel 1.2 open toward the supporting wing 2 and along the principal extension of the latter which, as a rule, coincides with a gravity line 11 thereof, into which channel air is introduced at a random site.

In the peripheral region the channel 1.2 is closed toward the outside, and the connection with the diaphragm 4 is effected by means of clamping straps 7 which are arranged flush with the supporting wing face. The static stability of the supporting wing 2 depends, apart from the choice of material and the dimensioning of its thickness, from the amount of level displacement 13 between the depth limit at the center of gravity 10 or a gravity line 11, on the one hand, and the periphery 12 of the supporting wing 2, on the other hand.

The shape of the inclination can be taken from the outline of the cross section through the supporting wing; it extends generally in straight lines, but can be devised in the direction of the heightened region thereof of circular/ concave/convex shape or of circular/calotte shape.

The device can be provided with at least one inflatable or rigid floating body 8,9, so that the aerator can be transferred to the water surface even in a filled tank. The elastic floating bodies are filled via a pipe or hose line prior to the removal of the aerating device from the tank, and will therefore float to the water surface after an arresting device holding the aerating device in the tank has been removed.

The embodiment of a round aerator shown in FIGS. 8 and 9 comprises a different embodiment of the air supply 1 which comprises a socket directed from below against the rigid supporting wing 2 arranged as a rule at the center of gravity 10 and being generally attached at the center of gravity of the wing. The supporting wing 2 is covered by the elastic, perforated diaphragm 4 which is connected with the rigid supporting wing along its periphery 12 by means of a sealing sleeve 14. This sealing sleeve 14 has a circumferential groove 15 in which there is lodged a clamping ring 16. In its central region, the diaphragm 4 is provided with a hub 17, thickened axially, where the diaphragm is connected with the rigid supprting wing 2 by means of a clamping disc having a bead 18 and screw 19. The ref. no. 1.3 indicates the air-inlets openings.

In the case of an air supply device 1 as shown in FIGS. 10 and 11, a thread-bearing socket is provided with an internal annular flange 20 on which the supporting wing 2 together with the diaphragm 4 comes to rest, being held in position thereon by means of an internally threaded collar 21 and a pressure ring 22.

Means for adjusting the position of the aerating device are not shown.

This position is fixed by means of pull rods, ropes, articulated joints or other known installations, with the inflatable floating bodies having finally the advantage that, with an equipoised arrangement and an equal degree of filling, the level of the aerator can be practically floatingly adjusted at last without carrying elements. In order to make possible, in a given case, a circulation of the water current through the aeration plane, throughholes can be provided in this plane, for instance, in the region of the air supply 1, which throughholes must be sealed in between the carrier wing and the diaphragm in order to prevent water from penetrating therebetween.

Finally it should be mentioned that the rigidity of the supporting wings can be augmented, as the case may be, by embossed indentations, in which case covering of the indentations by the diaphragm 4 must be taken into account when producing the perforations therein.

I claim:

1. A device for the aeration of a liquid in an aeration tank having a water surface, comprising:

an air supply;

a supporting body having a center of gravity with an aeration face having first perforations therein, a central portion having air inlet means connected to said air supply and a periphery being disposed slightly higher than said center of gravity;

a diaphragm of flexible, airtight material covering said supporting body and being attached thereto in airtight fashion about said periphery, said diaphragm having second perforations being out of alignment with said first perforations;

wherein air is fed from said air supply into said central portion of said supporting body, through said first perforations, between said diaphragm and said supporting body, outwards towards said periphery through said second perforations and with decreasing pressure into said liquid to be aerated.

2. The apparatus defined in claim 1, wherein said aerating face is extended in a plane being inclined with regard to the water surface at an angle of up to ±90°.

3. The apparatus defined in claim 1, further including swiveling means associated with said supporting body and adapted for swiveling said body.

4. The apparatus defined in claim 3, wherein said swiveling means is constructed and arranged to adjust said angle of inclination of said aeration face.

5. A device for the aeration of liquid in an aeration tank having a water surface comprising:

a rigid supporting body of random shape bearing an aeration face having first perforations therein, said supporting body having a center of gravity and a periphery being disposed slightly higher than said center of gravity;

a diaphragm of airtight material covering said supporting body and having second perforations in parts thereof out of register with said first perforations;

a frame structure adapted for locking said supporting body in a chosen position in said aeration tank;

an air supply adapted for feeding air into said supporting body and substantially in the center of gravity thereof, through said first perforations so as to enter a deflecting zone adapted to direct said air towards said periphery and to pass that air between said diaphragm and said supporting body with decreasing pressure into said liquid to be aerated.

6. The apparatus defined in claim 5, wherein said aerating face is extended in a plane being inclined with regard to the water surface at an angle of up to ±90°.

7. The apparatus defined in claim 5, further including swiveling means associated with said supporting body and adapted for swiveling said body.

8. The apparatus defined in claim 7, wherein said swiveling means is constructed and arranged to adjust said angle of inclination of said aeration face.

9. A device for the aeration of a liquid in an aeration tank having a water surface, comprising:
- a rigid supporting body having an aeration face with a first set of perforations therein, said supporting body having a center of gravity and a periphery being disposed slightly higher than said center of gravity;
- a diaphragm of airtight material covering said supporting body, being sealingly secured around the periphery thereof, and having second perforations in parts thereof out of register with said first perforations; and
- an air supply connected to said supporting body and adapted for feeding air into said support body through said first perforations and substantially in said center of gravity, so as to direct said air towards said periphery and to pass that air between said diaphragm and said supporting body and through the perforations in said diaphragm with decreasing pressure into said liquid to be aerated.

10. The apparatus defined in claim 9, wherein said aerating face is extended in a plane being inclined with regard to the water surface at an angle of up to ±90°.

11. The apparatus defined in claim 9, further including swiveling means associated with said supporting body and adapted for swiveling said body.

12. The apparatus defined in claim 11, wherein said swiveling means is constructed and arranged to adjust said angle of inclination of said aeration face.

* * * * *